US010047532B2

(12) United States Patent
Rau et al.

(10) Patent No.: US 10,047,532 B2
(45) Date of Patent: Aug. 14, 2018

(54) WORK MACHINE

(71) Applicant: Putzmeister Engineering GmbH, Aichtal (DE)

(72) Inventors: Benjamin Rau, Leinfelden-Echterdingen (DE); Eva Daum, Filderstadt (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 15/428,863

(22) Filed: Feb. 9, 2017

(65) Prior Publication Data

US 2017/0152669 A1 Jun. 1, 2017

Related U.S. Application Data

(63) Continuation of application No. PCT/EP2015/067474, filed on Jul. 30, 2015.

(30) Foreign Application Priority Data

Aug. 12, 2014 (DE) ........................ 10 2014 215 946

(51) Int. Cl.
*F16M 11/00* (2006.01)
*E04G 21/04* (2006.01)
(Continued)

(52) U.S. Cl.
CPC .......... *E04G 21/0445* (2013.01); *B66C 23/62* (2013.01); *E04G 21/0436* (2013.01); *B66C 23/68* (2013.01); *E02F 3/38* (2013.01)

(58) Field of Classification Search
CPC ............................ B66C 23/64; A01M 7/0078
See application file for complete search history.

(56) References Cited

U.S. PATENT DOCUMENTS 4,625,760 A 12/1986 Mertens
5,609,261 A 3/1997 Hensler
(Continued)

FOREIGN PATENT DOCUMENTS

DE 34 09 474 A1 9/1985
DE 42 03 820 A1 8/1993
(Continued)

OTHER PUBLICATIONS

English translation of International Preliminary Report on Patentability, PCT/EP2015/067474, dated Aug. 9, 2016.

*Primary Examiner* — Amy Jo Sterling
(74) *Attorney, Agent, or Firm* — Bose McKinney & Evans LLP

(57) ABSTRACT

This disclosure relates to a work machine with a chassis, with a mast block which is mounted on the chassis and has a rotary head which can be rotated about a vertical axis of rotation, and with a mast which has at least two mast arms, wherein each of the mast arms, with the exception of a last mast arm which has a free end, is pivotably connected, starting from a first mast arm, to the respectively following mast arm by means of an articulation, and wherein the first mast arm is mounted on the rotary head so as to be pivotable about a horizontal pivot axis. According to this disclosure, at least one chassis-mounted supporting device is provided which has a supporting surface on which a component of the articulation or a component of one of the articulations is supported.

10 Claims, 1 Drawing Sheet

(51) Int. Cl.

| | |
|---|---|
| ***B66C 23/62*** | (2006.01) |
| *B66C 23/68* | (2006.01) |
| *E02F 3/38* | (2006.01) |

(56) References Cited

U.S. PATENT DOCUMENTS

| | | | | |
|---|---|---|---|---|
| 9,033,165 | B2 * | 5/2015 | Aus | B66C 23/64 212/296 |
| 2010/0327129 | A1 * | 12/2010 | Chen | F16M 11/14 248/121 |
| 2014/0096853 | A1 | 4/2014 | Neubert et al. | |
| 2015/0098753 | A1 * | 4/2015 | Kuphal | A01C 23/008 403/83 |

FOREIGN PATENT DOCUMENTS

| | | | |
|---|---|---|---|
| DE | 10 2011 078 783 | A1 | 1/2013 |
| JP | S 62-14008 | U | 9/1987 |
| JP | H 6-53586 | U | 7/1994 |

* cited by examiner

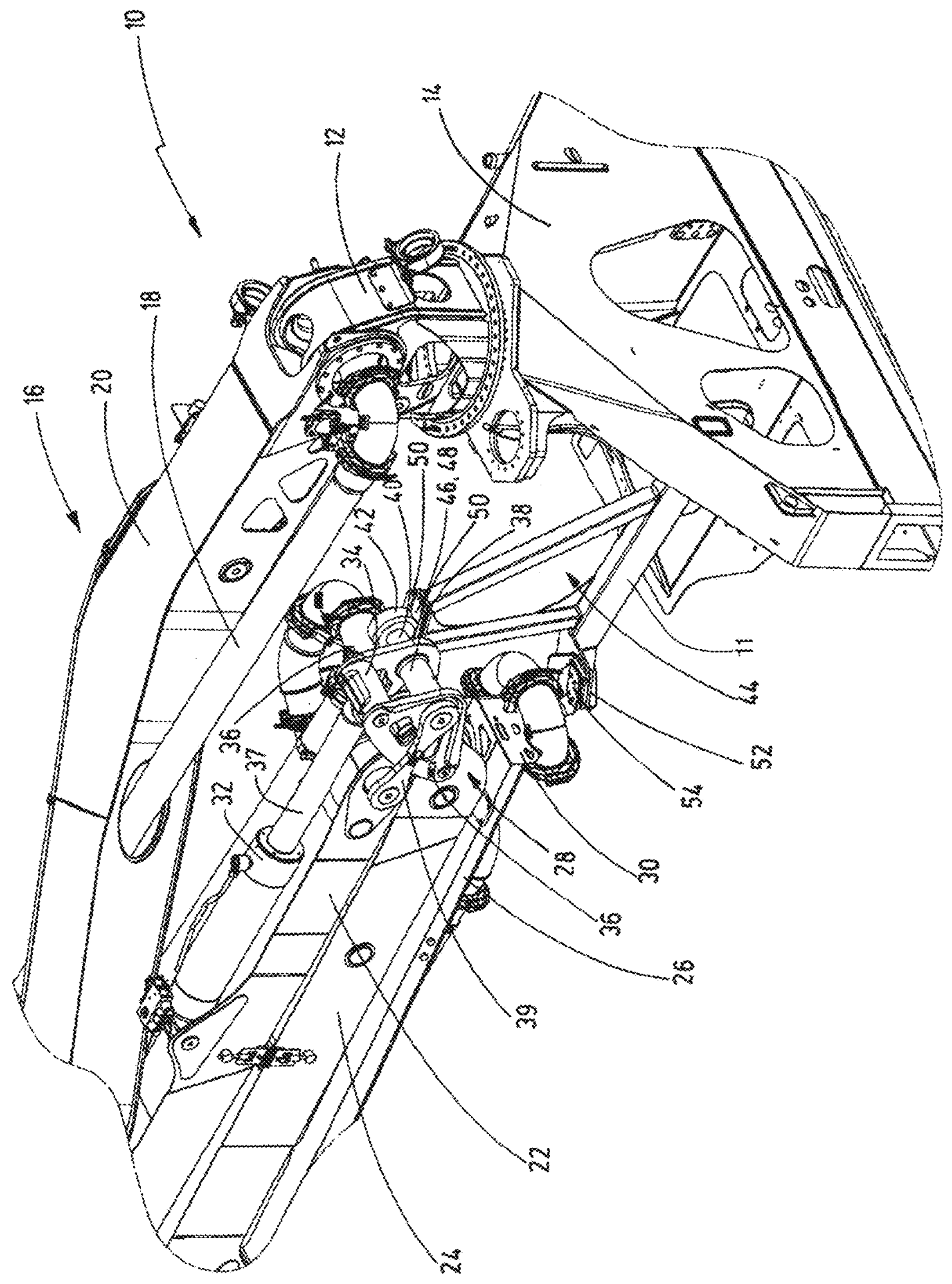
10
12
14
16
18
20
40
50
42
46, 48
34
50
38
11
44
52
54
36
37
32
28
30
36
26
39
22
24

WORK MACHINE

RELATED APPLICATIONS

This application is a continuation of PCT/EP2015/067474, filed Jul. 30, 2015, which claims priority to DE 10 2014 215 946.6, filed Aug. 12, 2014, both of which are hereby incorporated herein by reference in their entireties.

BACKGROUND

The invention relates to a work machine equipped with a boom, such as, for instance, mobile concrete pumps, pump mixers, excavators or cranes generally have at least two boom arms, which are mutually pivotable in order to be able to fold up the boom, which can have a considerable length, in a space-saving manner for transport. The boom arms are here placed in the folded state one upon another, wherein only the last boom arm, which has a free end, is supported with its free end, or close to the free end, on a chassis-fixed supporting device. By contrast, the further boom arms resting one upon another are respectively supported on the next lower boom arm. For this purpose, supporting devices, on which the respectively next upper boom arm of the folded boom is supported, are often arranged on the boom arms. In many smaller machines, for instance in pump mixers, which generally have a substantially smaller boom than a truck-mounted concrete pump and on the chassis of which, due to further devices like the mixing drum, there is little space available, such a support is often not possible, however.

SUMMARY

This disclosure teaches a refined work machine of the type stated above having a boom that can be better supported.

This disclosure is based on the notion of providing, in the region of the articulation which pivotably connects two boom arms one to the other and which, in the folded state of the boom, is always found at one of the two ends of the parcel formed by the boom arms lying one upon another, a support at a place where there is more space available than in the middle of the boom arms. It is here possible that only one articulation is supported on a preferably chassis-fixed supporting device. It is preferred, however, that a plurality of or all articulations are respectively supported on a supporting device, in which case a number of supporting devices which corresponds to the number of supported articulations must be present.

That component of the respective articulation which rests on the supporting surface of the supporting device can be, for instance, a lever which is respectively connected in a rotationally movable manner to the two boom arms connected to each other by the articulation and which serves to transmit a force for the mutual pivoting of the boom arms, for instance a shift lever. It is preferred, however, that the supported component is constituted by a hinge bolt, which connects two parts of the articulation one to the other and which is supported on the relevant supporting surface. The hinge bolt can have a bushing which envelops it and which rests on the relevant supporting surface. According to an illustrative embodiment, at least one of the hinge bolts has a supporting section, which projects in the axial direction over the articulation parts connected by said hinge bolt and which is supported on the relevant supporting surface. On at least one, and preferably on each, of the supporting sections there can advantageously be mounted a roller, which is rotatable about a longitudinal axis of the hinge bolt and which rests on the relevant supporting surface. When the roller is set down on the supporting surface, the hinge bolt normally also performs a movement with a component parallel to the supporting surface, so that the roller rolls on the latter. This leads to a preservation of the supporting surface, in particular if the roller is made of soft, wear-resistant plastic.

Expediently at least one, and preferably each, of the supporting surfaces, extends so far in a direction perpendicular to the longitudinal axis of the associated hinge bolt that it projects beyond the roller to both sides. The roller then has sufficient space to roll on the supporting surface throughout the setting-down operation. It is here preferred that at least one, and preferably each, of the supporting surfaces is formed in the shape of a channel, having a base surface and having side walls extending obliquely upward to both sides of borders of the base surface, which borders run perpendicular to the longitudinal axis of the hinge bolt. When the roller rolls on the supporting surface, the side walls lead to a centering of the roller, in that they direct the latter toward the base surface.

In addition to the supporting device(s), yet a further chassis-fixed supporting device, on which the free end of the last boom arm is supported, can be provided in order to still further improve the support of the entire boom. The further supporting device can be covered with a slidable rest made of wear-resistant plastic, just as the supporting surface can be formed of wear-resistant plastic. As the plastic for the covering of the further supporting device, for the supporting surface(s) and for the roller(s), in particular an aramide, and, in this context, in particular a plastic referred to as polyamide 6, can be considered.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows a detailed representation of the boom of a mobile pump mixer in perspective view.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

In this disclosure, the terms “horizontal” and “vertical” are generally used herein to establish positions of individual components relative to one another rather than an absolute angular position in space. Further, regardless of the reference frame, in this disclosure terms such as “vertical,” “parallel,” “horizontal,” “right angle,” “rectangular” and the like are not used to connote exact mathematical orientations or geometries, unless explicitly stated, but are instead used as terms of approximation. With this understanding, the term “vertical,” for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "boom arm," "articulation," "support," to name only a few, should be interpreted when appearing in this disclosure and claims to mean "one or more" or "at least one." All other terms used herein should be similarly interpreted unless it is made explicit that a singular interpretation is intended.

In FIG. 1, a part of a pump mixer 10 is partially represented, which part has a chassis (shown at reference number 11 in FIG. 1, not represented in detail) and a boom pedestal 14, which has a rotary head 12 rotatable about a vertical rotational axis. The pump mixer 10 also has a boom 16, which bears a concrete conveying line 18 with which concrete can be conveyed to an operating site by means of a concrete pump. The boom 16 has four boom arms 20, 22, 24, 26 articulately connected to one another, wherein a first of the boom arms 20 is mounted on the rotary head 12 so as to be pivotable about a horizontal pivot axis. A second of the boom arms 22 is pivotably connected to the first boom arm 20 by means of an articulation (not represented here), and to a third of the boom arms 24 by means of an articulation 28. Finally, the third boom arm 24 is connected by means of an articulation (not represented) to a fourth of the boom arms 26, which has a free end 30 at which, or close to which, the concrete-conveying line 18 also ends.

The articulation 28 connecting the second boom arm 22 to the third boom arm 24 has a shift lever 34, which is acted on by a hydraulic cylinder 32 and the force impingement of which by the hydraulic cylinder 32 produces a pivotal movement of the third boom arm 24 with respect to the second boom arm 22. Identical or similar articulations are likewise disposed between the first boom arm 20 and the second boom arm 22, as well as between the third boom arm 24 and the fourth boom arm 26, but are not represented in the drawing. The articulation 28 has two mutually spaced web plates 36 and a hinge bolt 38, which connects the web plates 36 one to the other and is rotatably led through each of the web plates 36 and which has a supporting section 40 that, in the axial direction of said articulation, projects beyond the outer side of one of the web plates 36. The web plates 36 are attached on one side to the third boom arm 24 and on the other side to a piston rod 37 of the cylinder 32. A connection to the second boom arm 22 is given by levers 39 attached to the second boom arm 22 on both sides thereof and also to the hinge bolt 38.

Rotatably mounted on the supporting section 40 is a plastics roller 42. For the supporting of the boom arms 22, 24 in the region of the articulation 28, a supporting device 44, which in the illustrative embodiment shown is fixed to the chassis and which has an upwardly directed supporting surface 46, is provided. In that folded-up state of the boom 14 which is shown in FIG. 1 and in which the boom arms 20, 22, 24, 26 are arranged lying one upon another or at just a short distance apart, the roller 42 rests on the supporting surface 46. The supporting surface 46 is here formed by a substantially horizontally running base surface 48 and by two side walls 50 which extend on both sides of the base surface 48 in a direction perpendicular to the longitudinal axis of the hinge bolt 38 and form an obtuse angle with the base surface 48. In the setting-down of the roller 42, the channel shape of the supporting surface 46 has a centering effect, so that the roller 42 does not have to land exactly on the base surface 48, but instead slides down the respective side wall 50 if it is mounted a little bit to the side of the base surface 48. Moreover, the supporting surface 46 extends somewhat in the direction perpendicular to the longitudinal axis of the hinge bolt 38, so that the roller 42 can roll some distance on said supporting surface when it is set down thereon.

For the supporting of the free end 30 of the fourth boom arm 26, a further, preferably chassis-fixed, supporting device 52, on which a component 54 disposed on the free end 30 is supported, is also provided.

In summary, the following can be stated: This disclosure relates to a work machine 10 comprising a chassis, comprising a boom pedestal 14, which is mounted on the chassis and has a rotary head 12 rotatable about a vertical rotational axis, and comprising a boom 16 having at least two boom arms 20, 22, 24, 26, wherein each of the boom arms 20, 22, 24, with the exception of a last boom arm 26 having a free end 30, is pivotably connected, starting from a first boom arm 20, to the respectively following boom arm 22, 24, 26 by means of an articulation 28, and wherein the first boom arm 20 is mounted on the rotary head 12 so as to be pivotable about a horizontal pivot axis. According to this disclosure, at least one, preferably chassis-fixed, supporting device 44, which has a supporting surface 46 on which a component of the articulation 28 or a component of one of the articulations 28 is supported, is provided.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

REFERENCE SYMBOL LIST

10 pump mixer
12 rotary head
14 boom pedestal
16 boom
18 concrete-conveying line
20, 22, 24, 26 boom arms
28 articulation
30 free end
32 hydraulic cylinder
34 shift lever
36 web plate
37 piston rod
38 hinge bolt
39 lever
40 supporting section
42 roller
44, 52 supporting device
46 supporting surface
48 base surface
50 side wall
54 component

What is claimed is:

1. A work machine, comprising:

a chassis;

a boom pedestal mounted on the chassis and having a rotary head rotatable about a vertical rotational axis;

a boom having a plurality of boom arms, a first one of the boom arms being mounted on the rotary head and pivotable about a horizontal pivot axis, wherein, starting from the first boom arm, each of the boom arms has a pivotable connection to a following boom arm, except a last one of the boom arms, which has a free end;

at least one of the pivotable connections comprising an articulation in which a hinge bolt pivotably connects two articulation parts; and a support mounted on the chassis and having a supporting surface configured to support a component of the articulation;

wherein the hinge bolt has a supporting section projecting beyond the two articulation parts and the supporting section is supported on the supporting surface.

2. The work machine as claimed in claim 1, wherein the support comprises a plurality of supports and the articulation comprises a plurality of articulations, each one of the articulations being supported by a respective one of the supports.

3. The work machine as claimed in claim 1, further comprising a roller which is rotatable about a longitudinal axis of the hinge bolt and which rests on the supporting surface.

4. The work machine as claimed in claim 3, wherein the supporting surfaces extends in a direction perpendicular to the longitudinal axis of the associated hinge bolt and projects beyond the roller.

5. The work machine as claimed in claim 3, wherein the supporting surface has a channel shape and has a base with side walls extending upward.

6. The work machine of claim 5, wherein the side walls form an obtuse angle with the base, whereby the roller can slide down a respective one of the sidewalls if the roller is not positioned centrally with respect to the base.

7. The work machine as claimed in claim 3, wherein the rollers are formed of plastic.

8. The work machine as claimed in claim 1, further comprising a second support on which the free end of the last boom arm is supported.

9. A work machine, comprising:

a chassis;

a boom pedestal mounted on the chassis and having a rotary head rotatable about a vertical rotational axis;

a boom having a plurality of boom arms, a first one of the boom arms being mounted on the rotary head and pivotable about a horizontal pivot axis, wherein, starting from the first boom arm, each of the boom arms has a pivotable connection to a following boom arm, except a last one of the boom arms, which has a free end;

at least one of the pivotable connections comprising an articulation in which a hinge bolt pivotably connects two articulation parts;

a support having a supporting surface configured to support a component of the articulation; and the hinge bolt having a supporting section projecting beyond the two articulation parts with a roller mounted to the supporting section, the roller being rotatable about a longitudinal axis of the hinge bolt and the roller resting on the supporting surface when the articulation is folded.

10. The work machine as claimed in claim 9, wherein the support is mounted to the chassis.

* * * * *